United States Patent [19]
Christianson

[11] Patent Number: 5,282,102
[45] Date of Patent: Jan. 25, 1994

[54] GIMBAL FOR MAGNETIC HEAD SUSPENSION SYSTEMS

[75] Inventor: Mark R. Christianson, Hutchinson, Minn.

[73] Assignee: Hutchinson Technology Incorporated, Hutchinson, Minn.

[21] Appl. No.: 842,264

[22] Filed: Feb. 27, 1992

[51] Int. Cl.⁵ .................... G11B 5/60; G11B 21/20
[52] U.S. Cl. .................................................. 360/104
[58] Field of Search ............... 360/103, 104, 105, 109

[56] References Cited

U.S. PATENT DOCUMENTS

| | | | |
|---|---|---|---|
| 4,058,843 | 11/1977 | Gyi | 360/103 |
| 4,280,156 | 7/1981 | Villette | 360/103 |
| 4,291,350 | 9/1981 | King et al. | 360/104 |
| 4,306,258 | 12/1981 | Higashiyama et al. | 360/105 |
| 4,399,476 | 8/1983 | King | 360/104 |
| 4,630,158 | 12/1986 | Spash | 360/103 |
| 4,853,813 | 8/1989 | Yamanouchi | 360/104 |
| 5,115,363 | 5/1992 | Khan et al. | 360/104 |
| 5,187,625 | 2/1993 | Blaeser et al. | 360/105 |

*Primary Examiner*—Stuart S. Levy
*Assistant Examiner*—Paul J. Ditmyer
*Attorney, Agent, or Firm*—Faegre & Benson

[57] ABSTRACT

An improved magnetic head suspension having a unitary load beam and flexure structure with a head support assembly including at least two bond pads for securing the read/write head which are joined by a torsionally flexible link. The head support assembly is connected to the load beam by torsionally-flexible links.

15 Claims, 8 Drawing Sheets

GIMBAL FOR MAGNETIC HEAD SUSPENSION SYSTEMS

1. FIELD OF THE INVENTION

This invention relates to an improved magnetic head suspension assembly, and in particular to an improved gimbal assembly for such suspensions.

BACKGROUND OF THE INVENTION

In magnetic disk storage devices, transducer heads are positioned and supported over rotating disks by means of an actuator assembly. The actuator is made up of rigid support arms to which head suspension assemblies (HSA) are attached. Each head rides over its respective disk surface on an air bearing. The suspension allows for controlled motion of the head so that it flies over the desired track at the proper height and attitude.

The present invention is an improved magnetic head suspension assembly (HSA) for use with dynamic magnetic storage devices or rigid disk drives. More specifically, it is an HSA which has an improved gimbal to increase its load-bearing capability, lower pitch and roll stiffness, and increase lateral and in-plane stiffnesses.

Conventionally available magnetic head suspension assemblies for rigid disk drives allow magnetic read/write heads to pitch about a first axis and roll about a second axis orthogonal to the first axis when imperfections in the disk drive assembly tend to place the heads in improper positions. The present invention is designed to allow significant reductions in the pitch and roll stiffness of the head suspension assembly allowing the head to easily maintain proper attitude, while at the same time providing proper load bearing capability. Further, the present invention is designed to increase the stiffness in the direction of rotation to maintain proper head position with respect to the suspension assembly. Still further, the invention is designed to resist permanent distortion caused by forces in all directions.

2. DESCRIPTION OF THE PRIOR ART

Prior art head suspension assemblies as the Type 16 suspension disclosed in a commonly assigned U.S. Pat. No. 5,198,945, issued Mar. 30, 1993 provide low pitch and roll stiffnesses but may not always provide sufficient vertical stiffness (i.e. perpendicular to the plane of the disk) to support a reasonable load for all applications.

In the Hutchinson Type 16, the low vertical stiffness of the gimbal may allow the magnetic transducer head to contact the HSA at low vertical loads. Such contact is unacceptable in that it limits the motion of the gimbal, generates particles and contamination, disturbs the flying attitude of the transducer head, and limits optimum performance of the disk storage device. Further, use of conventional suspension structures limits the improvement of vertical stiffness since pitch and roll stiffnesses are likely to become unacceptably large when sufficient vertical stiffness is achieved. Still further, the ease of manufacture of highly complex Type 16 suspension and flexure may be lost due to complicated geometries, difficult etching and forming operations, and sensitivity to handling during assembly.

SUMMARY OF THE INVENTION

The gimbal assembly of the present invention overcomes the limitations of the prior art by using a geometric configuration which produces significantly higher vertical stiffness while reducing pitch and roll stiffness and improving in-plane stiffness.

It is an object of the present invention to provide an improved gimbal for magnetic head suspension systems. This gimbal is primarily designed for, but not limited to use in, unitary load beam and flexure structures as in the Hutchinson Type 16 structure of the prior art.

Another object of the present invention is to provide a gimbal which has significantly improved resistance to vertical deflection, thus improving the load capacity of the gimbal.

A further object of the present invention is to provide a gimbal with reduced pitch and roll stiffness while maintaining proper load-bearing capacity.

A still further object of the present invention is to increase the in-plane stiffness of the gimbal while yet providing proper vertical, pitch, and roll stiffnesses.

BRIEF DESCRIPTION OF THE DRAWINGS

A detailed description of the invention is hereafter described with specific reference being made to the drawings in which.

DETAILED DESCRIPTION OF THE INVENTION

Figure 1:
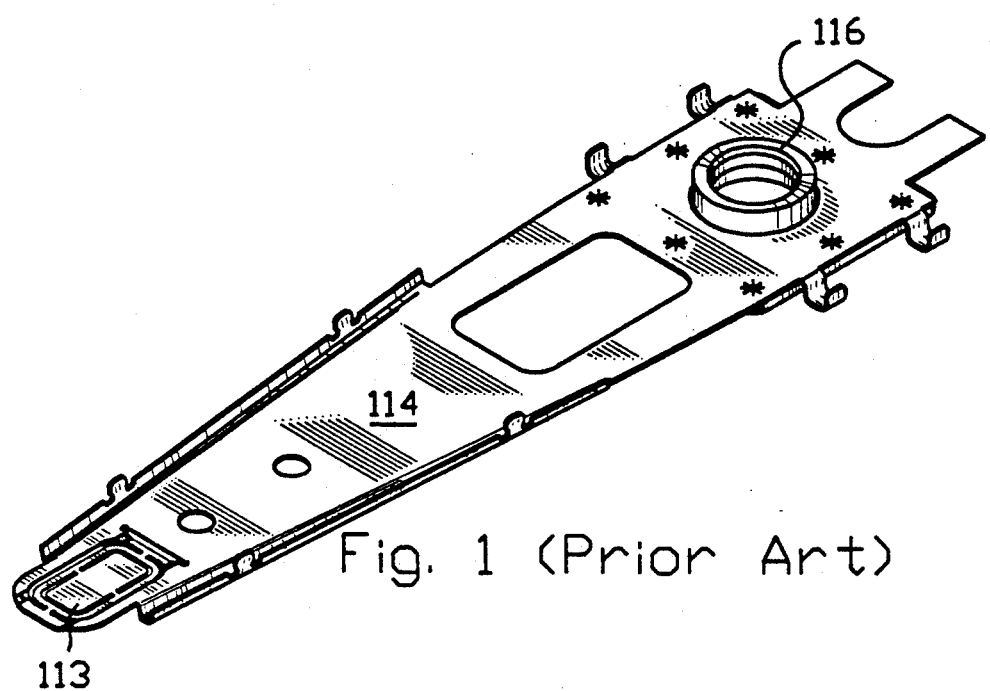
FIG. 1 is a perspective view of a prior art integrated gimbal head suspension assembly.
Figure 2:
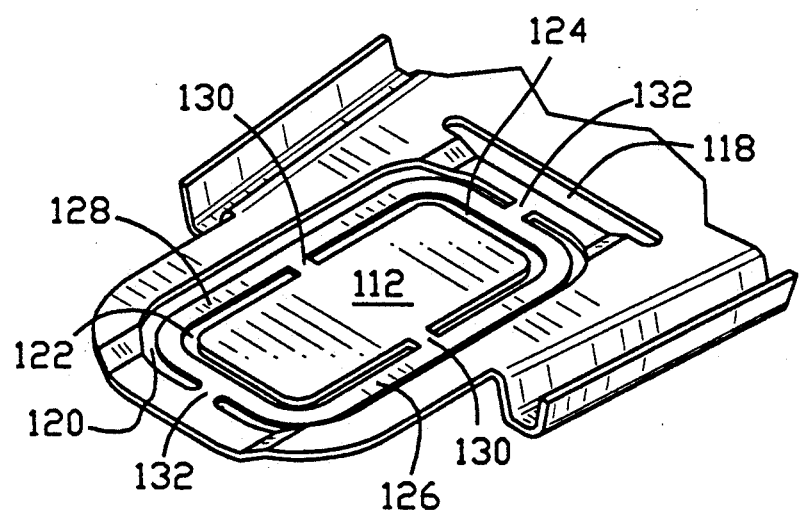
FIG. 2 is a detail of the gimbal from the prior art head suspension assembly of FIG. 1.

Turning now to the Type 16 suspension shown in FIG. 1, a conventional integrated magnetic head suspension is illustrated. It consists of a base plate 116 at the proximal end, a load beam 114, and an integrated gimbal 113 at the distal end of the load beam. FIG. 2 is a detail of the prior art integrated gimbal. It consists of a head bonding pad 112 to which a magnetic transducer head is to be bonded. The integral flexure structure is formed by etching a number of apertures or slots 118, 120, 122, 124 in the vicinity of the distal apex 113 of the load beam element 114 in order to form a plurality of flexible support arms 126, 128, 130, 132. These arms suspend the bonding pad 112 from the load beam 114. These arms and slots define the perimeter, or a portion of the perimeter, of the head bonding pad. The arms provide the vertical, pitch, roll, and in-plane stiffness of the gimbal.

Figure 3:
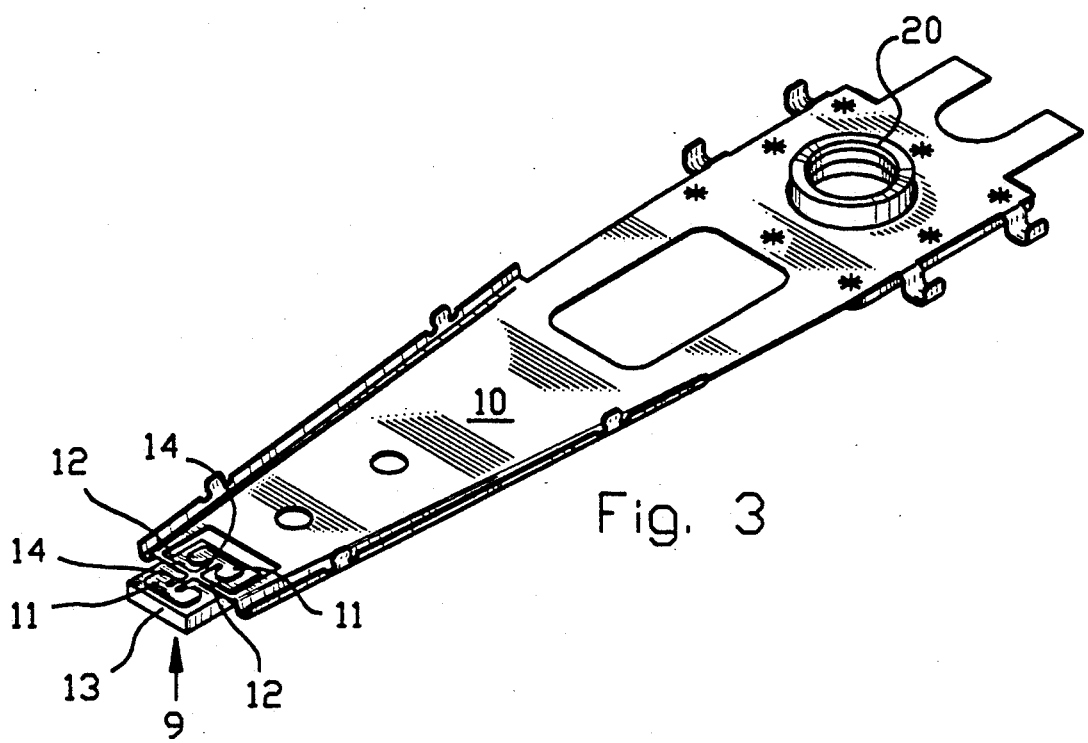
FIG. 3 is a perspective view of the present invention as integrated into a head suspension assembly.

The preferred form of the present invention is shown in FIGS. 3 through 7. FIG. 3 shows the present invention as incorporated as a unitary structure with a load beam 10 of a head suspension system. Base plate 20 is at the proximal end and magnetic transducer head 13 is at the distal end. This is one of many possible orientations and methods by which the present invention could be incorporated into the load beam although other variants may be within the scope of the present invention.

The present invention uses at least two separate bonding pads 11 as attachment points for the magnetic transducer head 13. Bond pads 11 are often adhesively secured to head 13 using conventional adhesives. The pads 11 may alternatively be secured by laser or ultrasonic welding or any other process to permanently adhere the pad 11 to head 13.

Bonding pads 11 can be of arbitrary shape. As the suspension is positioned to place head 13 in proximity with the surface of a moving disk, the air bearing surface 9 of the transducer head 13 transmits a vertical load to the gimbal. The required gimballing action of the head is provided by rotations about the load beam connecting torsionally flexible arms 12 and the bond pad connecting torsion elements 14. These torsion links 12 and 14 Serve a multiple purpose in that they provide vertical stiffness, in-plane stiffness, and allow pitching and rolling actions to occur freely, as necessary for proper tracking of the head.

Figure 4:
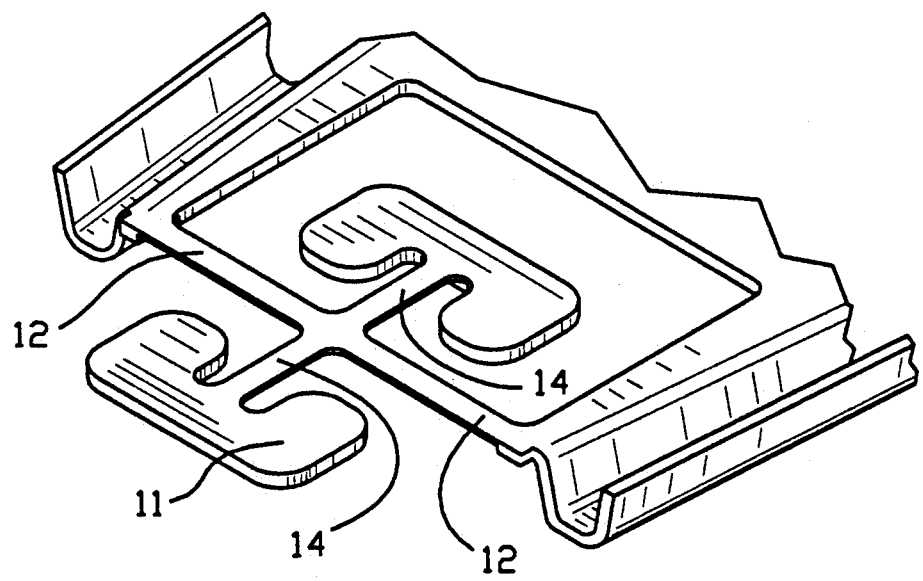
FIG. 4 is a detailed perspective view of one embodiment of the present invention.

FIG. 4 is a detail of the present invention. The present invention uses a continuous straight or nearly straight load beam connecting torsion bar 12 as both the primary vertical load support and as a torsional member for gimballing motion. The tensile forces set up in the load beam connection torsion bar 12 when a vertical load is applied produce a nonlinear spring effect. More specifically, the vertical spring constant is a function of vertical deflection. This vertical spring constant increases with vertical deflection, thus producing the said nonlinear spring effect. The bond pad connecting torsion bar 14 transmits the vertical force at the bonding pads to the load beam connecting torsion bar 12. Torsion bars 12 and 14 are made of thinner material than the bonding pads 11 to provide the necessary motion clearance for head 13.

In the Type 16 suspension shown in the prior art patent application, the support arms are positioned around the perimeter of the bonding pad. Such a prior art configuration with the bond pad in the center of the gimbal prevents the arms from being straight. The required curvature of the arms in the Type 16 prior art may cause them to bend easily when subjected to a vertical load. Because of those physical constraints, the Type 16 devices may not supply vertical stiffness to the same degree that it is supplied by the present invention.

The present invention also provides increased in-plane stiffness. In-plane stiffness refers to the stiffness of the gimbal parallel to the plane of the bonding pads. A large in-plane stiffness is important in that it maintains the proper location of the transducer head relative to the load beam when subjected to accelerations and stiction loads. The present design provides this large in-plane stiffness by the same nonlinear spring effect as described in the previous paragraph.

Along with increased resistance to vertical deflection and increased in-plane stiffness, the present invention produces low pitch and roll stiffness. In the present invention, the pitch and roll stiffness is the result of twisting about the axes of torsion links 12 and 14. The ability of those links to support high vertical loads with a limited cross section of material allows the polar moment of inertia of these cross sections to be minimized. Reduction of those polar moments of inertia results in lower pitch and roll stiffness. These torsion bars 12 and 14 can have arbitrary lengths, cross-sections, tapers, and filleted connections as dictated by the performance requirements and peculiar geometry of an application. The length and cross-section of torsion bars or links 12 and 14 also control the vertical and in-plane stiffness. Thus the selection of the lengths and cross-sections of torsion bars 12 and 14 must involve simultaneous consideration of the required vertical, pitch, roll, and in-plane stiffnesses.

Figure 4A:
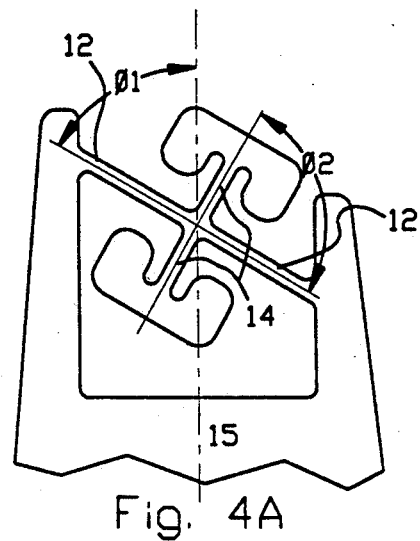
FIG. 4A shows the relationships of angles Φ 1 and Φ 2.
Figure 4B:
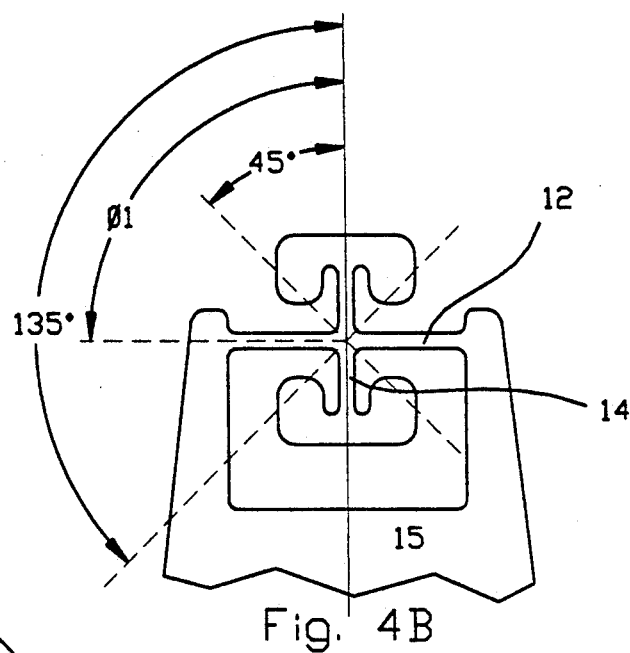
FIG. 4B shows the range of Φ 1 relative to the centerline of the load beam.
Figure 4C:
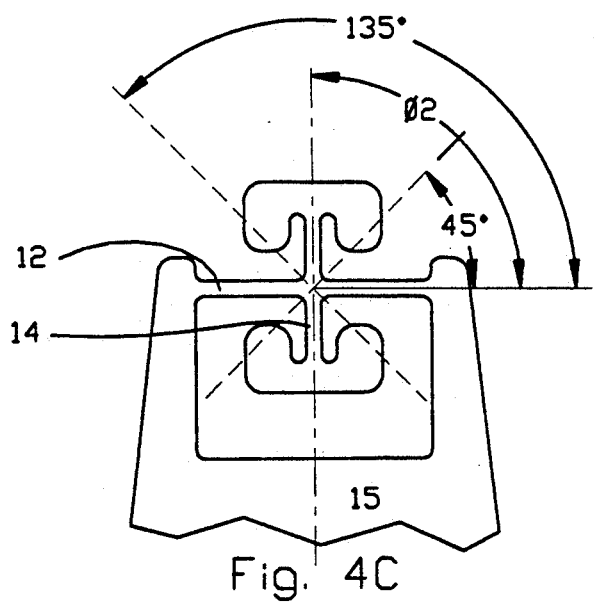
FIG. 4C shows the range of Φ 2 relative to the centerline of the torsion bar.

The angles $\Phi 1$ and $\Phi 2$ in FIGS. 4A, 4B and 4C show how optional orientations of the present design can be controlled. Angle $\Phi 1$ in FIGS. 4A and 4B refers to the orientation of the load beam connecting torsion bar 12 relative to the load beam centerline. Angle $\Phi 2$ in FIGS. 4A and 4C refers to the orientation of the bond pad connecting torsion bar 14 relative to the load beam connecting torsion bar 12. Both of these angles can be varied without sacrificing vertical stiffness.

Figure 5:
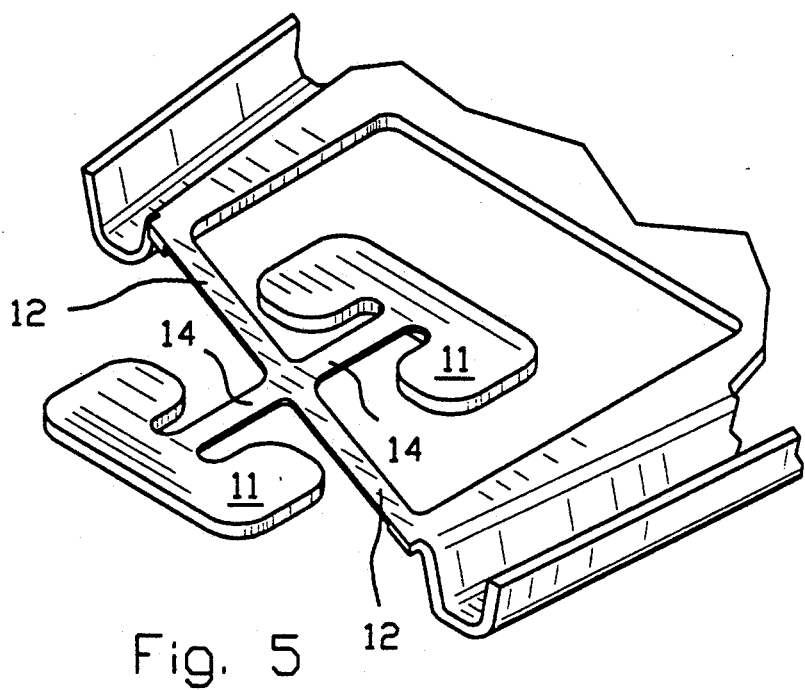
FIG. 5 is a detailed perspective view of an alternative embodiment of the present invention.

In FIGS. 4A and 5, alternative embodiments are shown wherein the angles $\Phi 1$ and $\Phi 2$ are non-orthogonal. They can typically range within 45 degrees of orthogonal for useful structures.

In FIG. 5, angle $\Phi 1$ is 60° and angle $\Phi 2$ is 120°.

Figure 6A:
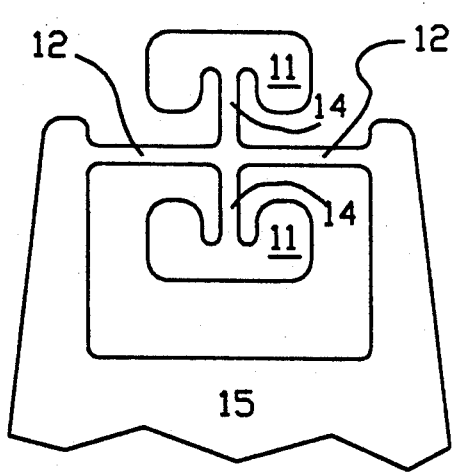
FIGS. 6A, 6B, and 6C are top views of further alternative embodiments of load beam configurations incorporating the present invention.
Figure 6B:
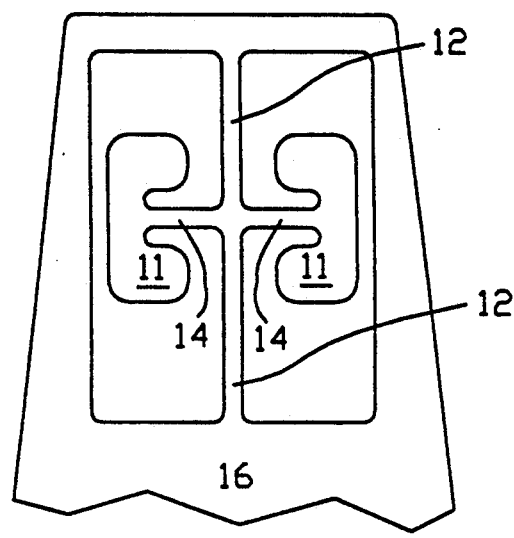
Figure 6C:
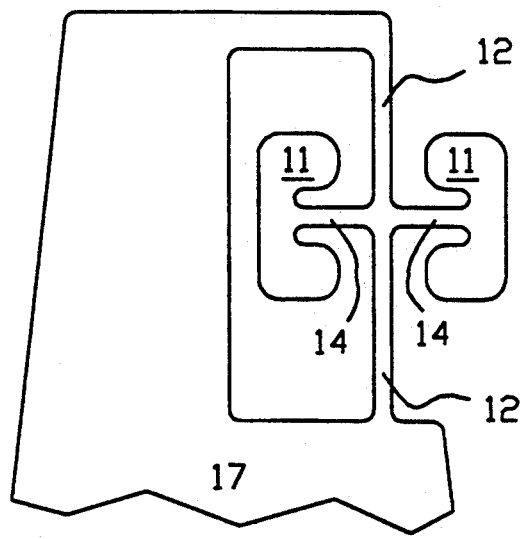

FIGS. 6A, 6B, and 6C show some, but not all, of the possible configurations for incorporating the present invention into a load beam. In FIG. 6A the load beam connecting torsion bar 12 is orthogonal to the longitudinal axis of the load beam 15. In FIG. 6B load beam connecting torsion bar 12 lies along the longitudinal axis of the load beam 16. In FIG. 6C the present design is asymmetrically positioned on the load beam 17.

Figure 7A:
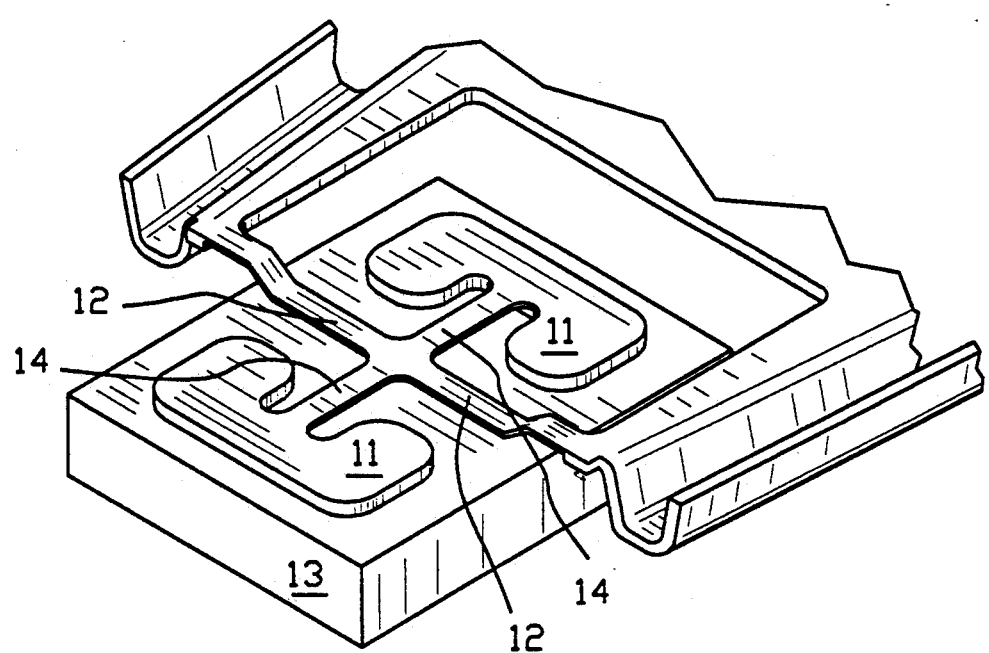
FIGS. 7A, 7B, and 7C are still further alternative embodiments utilizing possible forming options that could be used when incorporating the present invention into a load beam.
Figure 7B:
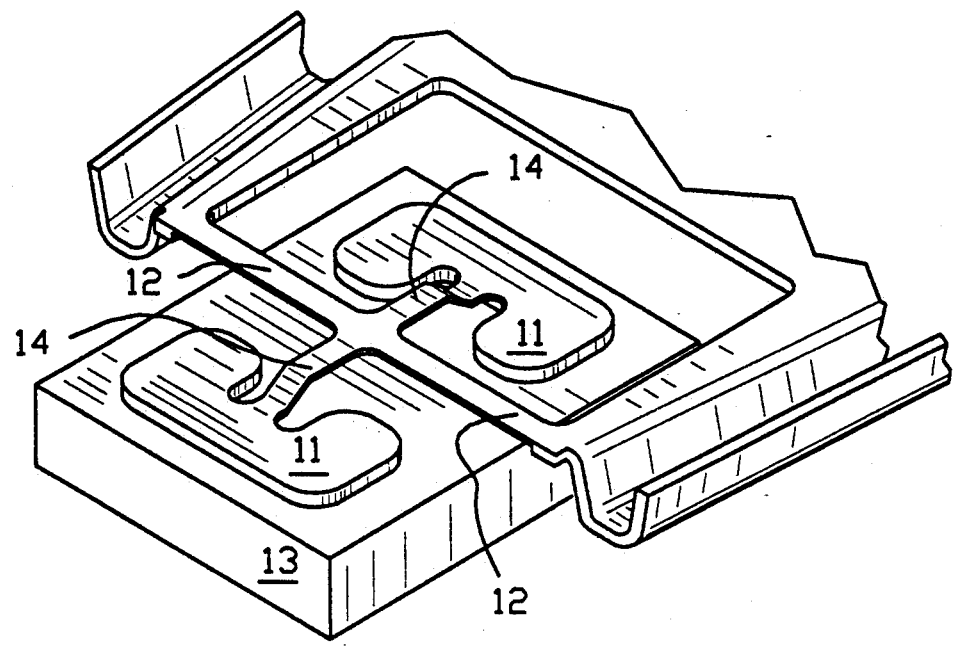
Figure 7C:
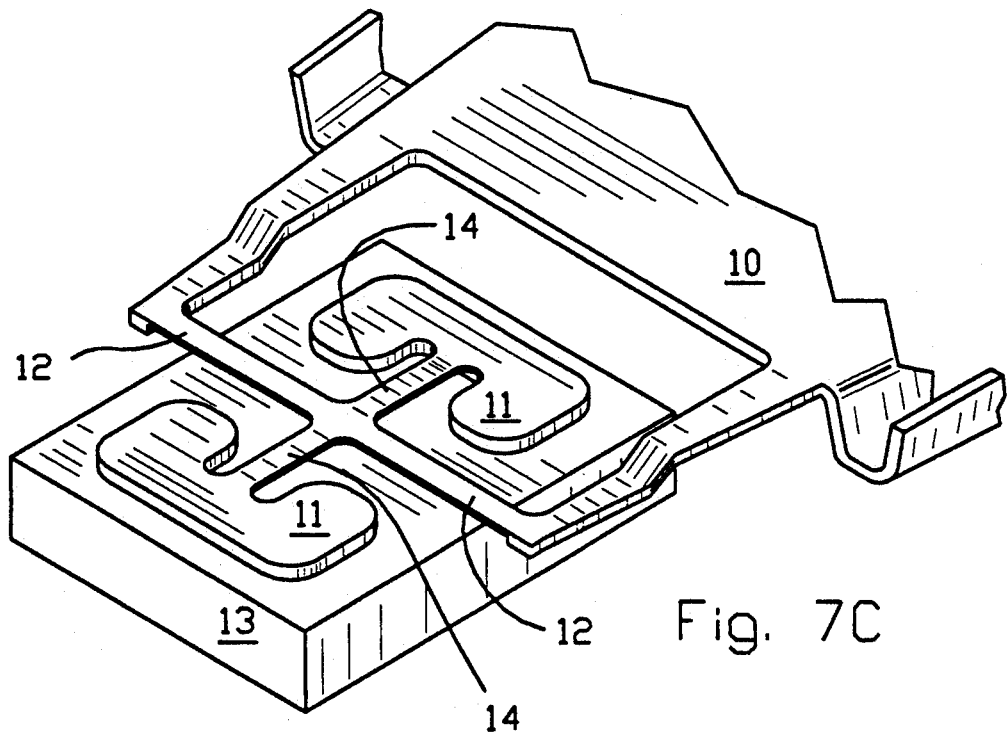

FIGS. 7A through 7C show some, but not all, of the possible forming options that can be used when incorporating the present invention into a load beam. Forming can be used to gain clearances or control the gimbal motion as required by the design. FIG. 7A shows the load beam connecting torsion bar 12 formed to offset bar 12 downwardly to allow for movement of head 13. This forming option provides greater clearance between the transducer head and the load beam. FIG. 7B shows a forming option for the bond pad connecting torsion bar 14. This forming option again can be used to produce clearances as required by the particular application. FIG. 7C shows an option by which the load beam itself can be formed to facilitate clearance between the head and load beam 10. Although specific examples of incorporating the present invention into head suspension assemblies have been presented, other methods of attaching and forming are possible.

Figure 8:
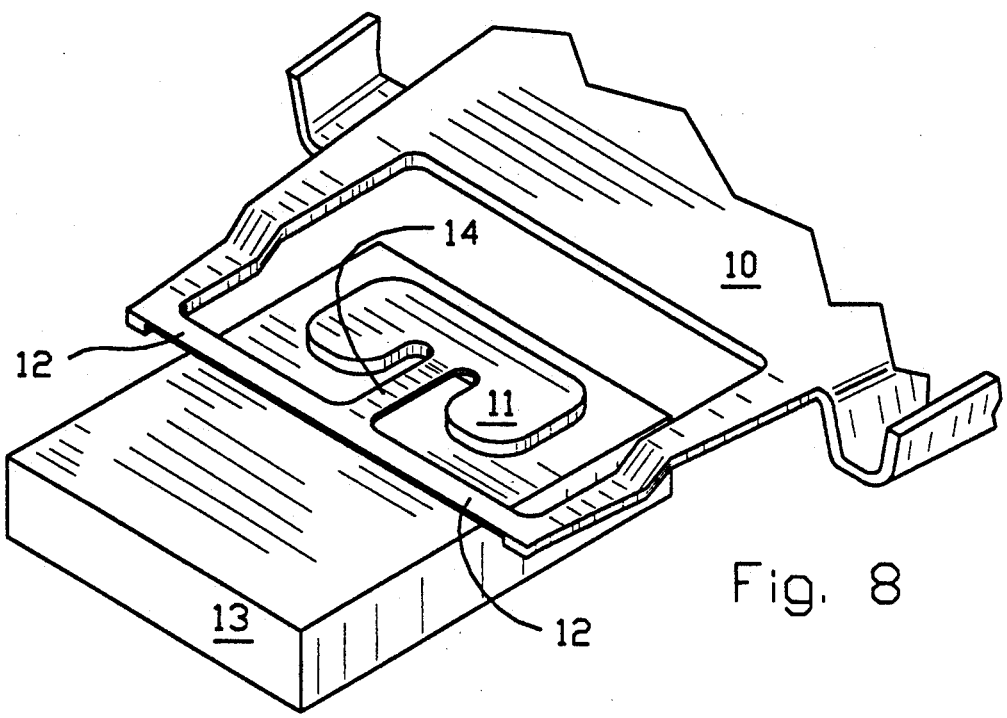
FIG. 8 is an alternative embodiment showing only a single bond pad.

FIG. 8 shows an alternative embodiment where the torsion bar 12 connects the ends of the head support arms which project from the end of load beam 10. A single bond bad connecting torsion bar or link 14 is connected between the mid point of torsion bar 12 and pad 11 to suspend head 13 from the sole point of support of bond pad 11. As is the case with the other embodiments of this invention, neither torsion bar 12 nor torsion link 14 are normally attached to or even in contact with the surface of head 14. Either by forming or use of thinned sheet material, the torsion elements 12 and 14 are normally well-spaced from head 14.

Figure 9:
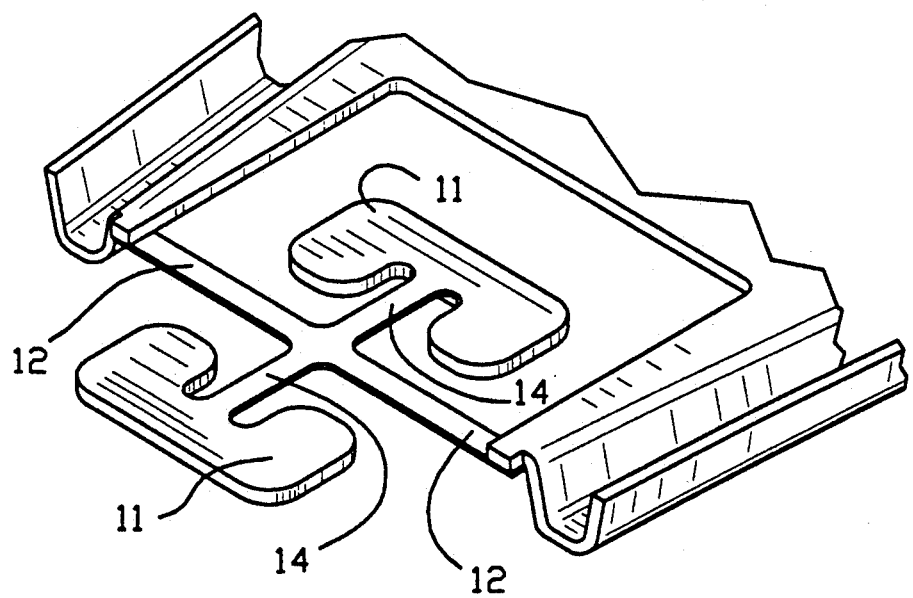
FIG. 9 shows another embodiment in which the gimbal is a separate member attached to the load beam.

FIG. 9 shows an alternative embodiment wherein the gimbal assembly and the load beam are initially separate pieces and are attached by known methods such as bonding or welding.

In considering the invention it must be remembered that the disclosure is illustrative only and that the scope of the invention is to be determined by the following claims.

What is claimed is:

1. A magnetic head suspension for attachment to an actuator arm, said head suspension comprising, in combination:
   (a) a spring load beam element portion joined to the actuator arm at one end thereof, the other end thereof characterized by a pair of substantially rigid head support arms projecting from said load beam element thereby to define a clearance opening there between for receiving a magnetic head;
   (b) a flexure portion supported between the head support arms, the flexure portion being divided into
      (1) a support assembly comprised of at least to head support bond pads separate and independent of each other joined by a flexible bond pad connecting torsion element, from which the bond pads are also separate and independent, said torsion element being a continuous essentially straight load beam connecting primary vertical load support and providing separate and independent torsional gimballing motion of each bond pad, each bond pad constructed and arranged for being bonded to a disk drive head separately and independently of each other; and
      (2) at least two torsionally flexible arms connected between the support assembly and the head support arms, such that the bond pad torsion element transmits vertical force at the bonding pads to the torsionally flexible arms.

2. The invention of claim 1 wherein the load beam element portion and the flexure portion are separate pieces welded to each other.

3. The invention of claim 1 wherein the magnetic head suspension is unitary and the load beam element portion and the flexure portion are formed from a single piece of sheet material.

4. The invention of claim 1 wherein at least some of the torsionally flexible arms have at least one bend along their length.

5. The invention claimed in claim 1 wherein the torsional flexible arms are oriented substantially perpendicular to the longitudinal axis of the load beam.

6. The invention claimed in claim 1 wherein the torsional flexible arms are oriented substantially perpendicular to the longitudinal axis of the load beam and the flexible bond pad support connecting torsion element is oriented at an angle $\Phi 1$ to the longitudinal axis of the load beam where $\Phi 1$ ranges between 45 and 135 degrees.

7. The invention claimed in claim 1 wherein the torsionally flexible arms are oriented substantially parallel to and positioned substantially on the longitudinal axis of the load beam.

8. The invention claimed in claim 1 wherein the torsionally flexible arms are oriented substantially parallel to and substantially offset from the longitudinal axis of the load beam.

9. The invention of claim 8 wherein the thickness of the bond pad is at least about 0.075 mm and the thickness of the torsionally flexible arms and the bond pad connecting torsion elements is less than about 0.025 mm.

10. The invention of claim 1 wherein the thicknesses of the torsionally flexible arms and the bond pad connecting torsion elements are less than the thickness of the bond pad thereby providing clearance for gimballed movement of a head bonded to the bond pads.

11. The invention of claim 1 wherein the bond pad connecting torsion element is formed to offset it from the plane of the load beam thereby providing clearance for gimballed movement of a head bonded to the bond pads.

12. The invention of claim 1 wherein the torsionally flexible arms are formed to offset them from the plane of the load beam thereby providing clearance for gimballed movement of a head bonded to the bond pads.

13. The invention of claim 1 wherein the load beam is formed to offset the head support assembly from the plane of the load beam thereby providing clearance for gimballed movement of a head bonded to the bond pads.

14. In a magnetic head suspension for supporting a magnetic head at a fixed distance from a rigid arm, a unitary flexure and load beam comprising:
   (a) a spring load beam element portion joined to the arm at a proximal end thereof; and
   (b) a flexure portion projecting beyond the distal apex of the element, the flexure portion being divided into
      (1) a head support means for receiving a disk drive head to be bonded thereto, the head support means being comprised of
         (i) at least two head support bond pads separate and independent of each other, each bond pad constructed and arranged for bonding to a disk drive head separately and independently of each other;
         (ii) a flexible bond pad connecting torsion element operatively coupling said pads, said torsion element being a continuous essentially straight load beam connecting primary vertical load support providing separate and independent torsional gimballing motion for each bond pad, and
      (2) a pair of flexible arms supporting the head support means, the flexure arm portions, and the head support means cooperating to provide gimbal support to a head bonded to the bonding pads, such that the bond pad connecting torsion element transmits vertical force applied to the bonding pads to the torsionally flexible arms.

15. A magnetic head suspension for attachment to an actuator arm, said head suspension comprising, in combination:
   (a) a spring load beam element portion joined to the actuator arm at one end thereof, the other end thereof characterized by a pair of substantially rigid head support arms projecting from said load beam element thereby defining a clearance opening therebetween for receiving a magnetic head;
   (b) a flexure portion supported between the head support arms, the flexure portion being divided into
      (1) a support assembly comprised of at least two head support bond pads wherein each such bond pad is supported separately and independently of the other by a flexible bond pad torsion element, from which the bond pads are also separate and independent, each said torsion element being a continuous essentially straight load beam connecting vertical load support, which provides separate and independent torsional gimballing motion of each bond pad, each bond pad constructed and arranged for being bonded to a disk drive head separately and independently of each other; and (2) at least two torsionally flexible arms connected between the support assembly and the head support arms, such that the bond pad torsion element transmits vertical force at the bond pads to the torsionally flexible arms.

* * * * *

UNITED STATES PATENT AND TRADEMARK OFFICE
CERTIFICATE OF CORRECTION

PATENT NO. : 5,282,102
DATED : January 25, 1994
INVENTOR(S) : Mark R. Christianson It is certified that error appears in the above-indentified patent and that said Letters Patent is hereby corrected as shown below:

On the title page, Item [75],

The Inventors should read: Mark R. Christianson, Hutchinson, Minn.; Brent Lien, Minneapolis, Minn.

Signed and Sealed this

Fourth Day of July, 1995

*Attest:*

BRUCE LEHMAN

*Attesting Officer*     *Commissioner of Patents and Trademarks*